United States Patent Office 3,232,986
Patented Feb. 1, 1966

3,232,986
SULFURIC ACID ADDUCT OF CYCLO-BUTANE-1,2-DICARBOXAMIDE
Janice L. Greene, Warrensville Heights, and James D. Idol, Jr., Shaker Heights, Ohio, assignors to The Standard Oil Company, Cleveland, Ohio, a corporation of Ohio
No Drawing. Filed Nov. 2, 1964, Ser. No. 408,354
1 Claim. (Cl. 260—557)

This is a continuation-in-part application of our co-pending U.S. patent application, Serial No. 214,532, filed August 3, 1962.

This invention relates to the cyclo-butane-1,2-dicyanide adduct with sulfuric acid monohydrate. The invention is also concerned with the method of making the adduct by reacting cyclo-butane-1,2-dicyanide with the monohydrate of sulfuric acid.

Either the cis or trans forms of the cyclo-butane-1,2-dicyanide can be used as a starting material to form cis or trans dicarboxamide adducts. The invention is also applicable to a mixture. The trans-cyclo-butane-1,2-dicyanide is the more readily available starting material and this form will be described in the preferred embodiment hereinafter.

The starting materials and relative amounts are indicated by the following formulas:

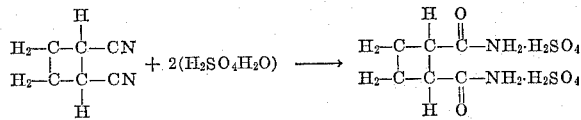

The structure of the product of the present invention is:

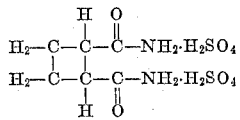

and this compound may exist in the following tautomeric forms:

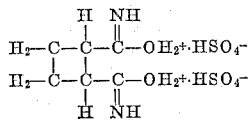

and

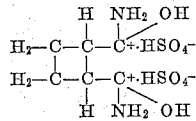

In carrying out the process, the sulphuric acid monohydrate and the cyclo-butane-1,2-dicyanide are mixed together or one added to the other at a temperature of from 40 to 125° C. for from 15 minutes to four hours, followed by cooling or permitting the reaction product to come to ambient temperature. The higher the reaction temperature, the shorter the reaction time, and the lower the temperature, the longer the reaction time. The reaction is exothermic and external cooling can be used if desired. Temperatures of from 50 to 95° C. are preferred because higher temperatures may somewhat affect the stability of the cyclo-butane ring. The preferred reaction time in this temperature range is 1 to 2 hours.

The relative amounts of the reaction components are preferably theoretical, but an excess of either can be used in the process, but will remain in the final product unless steps are taken to separate it.

The adduct made in accordance with the present invention is useful as a chemical intermediate, such as in the formation of cyclo-butane-1,2-dicarboxamide, the preparation of which is described in U.S. Patent No. 3,110,729.

The following is the best mode contemplated for carrying out the invention:

*Example I*

1 mole of trans-cyclo-butane-1,2-dicyanide was gradually added to 2 moles of sulfuric acid monohydrate at a rate so that the temperature was maintained between 75 and 95° C. with external cooling supplied as needed. The mixture was maintained at a temperature of 70° C. for 1½ hours with constant stirring. It was then cooled to ambient temperature. The adduct was a clear, white, viscous liquid, and extremely hygroscopic.

It had the following analysis:

|  | Theoretical, percent | Actual, percent |
| --- | --- | --- |
| Carbon | 21.3 | 20.99 |
| Hydrogen | 4.15 | 4.07 |
| Nitrogen | 8.30 | 7.96 |
| Sulfur | 18.95 | 18.75 |

In addition to the above analysis, the nuclear magnetic resonance spectrum confirms the presence of the cyclo-butane ring and the infrared spectrum confirms the absence of any nitrile groups.

We claim:
The compound having the formula

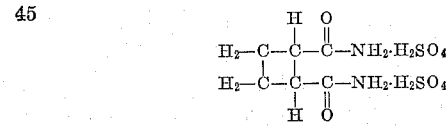

References Cited by the Examiner

McElvain: The Characterization of Organic Compounds, revised edition, page 67, N.Y., Macmillan, 1953.
Perkin: Jour. Chem. Soc., vol. 65, page 584 (1894).
Shuikina: Chemical Abstracts, vol. 38, page 3258 (1944).

WALTER A. MODANCE, *Primary Examiner.*